United States Patent
Hampton et al.

(10) Patent No.: US 9,158,634 B2
(45) Date of Patent: Oct. 13, 2015

(54) ERROR CONTROL CODING

(75) Inventors: John D. Hampton, Meridian, ID (US);
Neil Thomas Hutchon, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 14/113,957

(22) PCT Filed: May 19, 2011

(86) PCT No.: PCT/US2011/037184
§ 371 (c)(1),
(2), (4) Date: Oct. 25, 2013

(87) PCT Pub. No.: WO2012/158171
PCT Pub. Date: Nov. 22, 2012

(65) Prior Publication Data
US 2014/0053015 A1  Feb. 20, 2014

(51) Int. Cl.
*G06F 11/16* (2006.01)
*G11B 20/18* (2006.01)

(52) U.S. Cl.
CPC ........ *G06F 11/1666* (2013.01); *G11B 20/1833* (2013.01); *G11B 2020/1836* (2013.01); *G11B 2220/90* (2013.01)

(58) Field of Classification Search
CPC .................. G06F 11/1666; G11B 2020/1836; G11B 20/1833; G11B 20/10222; G11B 2220/90; G11B 20/1202; G11B 20/1403; G11B 2220/93
See application file for complete search history.

(56) References Cited

U.S. PATENT DOCUMENTS

| | | | |
|---|---|---|---|
| 6,317,280 B1 * | 11/2001 | Nakajima et al. | 360/59 |
| 6,393,511 B1 * | 5/2002 | Albrecht et al. | 711/4 |
| 6,631,488 B1 | 10/2003 | Stambaugh et al. | |
| 6,937,412 B1 * | 8/2005 | Gill et al. | 360/48 |
| 7,505,221 B2 * | 3/2009 | Watson | 360/53 |
| 7,573,664 B2 * | 8/2009 | Bentley et al. | 360/31 |
| 2005/0270856 A1 * | 12/2005 | Earhart et al. | 365/189.05 |

(Continued)

FOREIGN PATENT DOCUMENTS

| JP | 200318020 | 1/2003 |
|---|---|---|
| KR | 1020080098241 | 11/2008 |
| WO | WO-2009102304 | 8/2009 |

OTHER PUBLICATIONS

ISR/WO, PCT/US2011/037184, HP reference 82263791, Feb. 10, 2012, 9 pps.

*Primary Examiner* — Nadeem Iqbal
(74) *Attorney, Agent, or Firm* — Hewlett-Packard Patent Department (57) ABSTRACT

A data writer is described comprising: a memory to store at least one amount of source data that is to be written to a data storage medium; a processor to arrange the source data into subsets and generate ECC data in respect of each subset, wherein the source data and the associated ECC data are to be written to a data storage medium via a plurality of individual data channels, and wherein the ECC data comprises at least a first degree of ECC protection having a first level of redundancy in respect of a first subset and a second degree of ECC protection having a second level of redundancy in respect of a second subset; a plurality of data writing elements, each to write data from an associated data channel, concurrently with the writing by the other data writing elements of data from respective data channels, to a data storage medium; and a controller, to control the writing by the data writing elements of the source data and the associated ECC data to the data storage medium.

19 Claims, 8 Drawing Sheets

(56) References Cited

U.S. PATENT DOCUMENTS

| | | |
|---|---|---|
| 2008/0082892 A1 | 4/2008 | Kushida |
| 2008/0098280 A1 | 4/2008 | Andersen |
| 2008/0158720 A1* | 7/2008 | Watson ...................... 360/77.12 |
| 2008/0222490 A1 | 9/2008 | Leung et al. |
| 2009/0198881 A1 | 8/2009 | Toda |
| 2010/0079896 A1* | 4/2010 | Biskeborn et al. .............. 360/71 |
| 2011/0055671 A1 | 3/2011 | Kim et al. |
| 2012/0281304 A1* | 11/2012 | Jin et al. .......................... 360/31 |

* cited by examiner

ERROR CONTROL CODING

FIELD

The present invention is in the field of error control coding and, in particular, but not exclusively, it relates to the application of error control coding to data for the purposes of ensuring reliable data recovery after the data has been processed in a channel and, for example, stored in a data storage medium or transmitted across a transmission medium.

BACKGROUND

As used herein, the term error control coding (ECC) is intended to encompass broadly any kind of coding that is employed to assist in any one or more of: identifying the presence of a data error, identifying where in an amount of data an error is, and correcting an error. 'Error control coding' should not be confused with the more limited term 'error correction coding', which is treated herein as a sub-set of error control coding.

In the fields of data storage and data transmission in particular, it is well known to apply ECC to protect source data before the data is transmitted over a channel to be stored to a data storage medium or transmitted over a transmission medium. The term 'channel' is intended herein to encompass broadly the means (for example, electronics, optics and any other kinds of data processing elements) by which, for example, data is written to or read from a physical storage medium, or transmitted over or received from a physical or wireless communications medium.

ECC typically takes the form of additional data (which is sometimes referred to as 'redundant' data, or simply 'redundancy'), which is added to or combined with the source data upstream of the channel (that is, before the data is written or transmitted). The term 'source data' is intended herein to mean the data to which the ECC will be applied, and does not imply any particular point of origin, the term 'protected data' is intended to mean the source data after it has been protected by ECC, and the term 'recovered data' is intended to mean data that has been retrieved from a storage medium after storage or receipt by a receiver after transmission. In many cases, but not always, source data and protected data are the same, except that the protected data is accompanied by ECC data when it is applied to a channel. In a perfect system in which no storage or transmission errors occur, it is expected that the recovered data should match the source data without the need to employ the ECC data. However, when in a practical system the recovered data does not match the source data (that is, data errors have occurred), different degrees of ECC can be used to detect the presence of errors, indicate where the errors are and correct the errors in the recovered data.

There are a large number of very well known ECC data protection techniques, including parity, checksums, hashing algorithms and Reed-Solomon codes, to name just a few. Commonly, in ECC parlance, a 'distance' is defined as a number of differences (for example, errors) between the source data and the recovered data. Further, the term 'minimum distance' may be used to indicate, for a given ECC technique, a degree of error detecting and/or correcting that can be achieved; also bearing in mind that some techniques such as Reed-Solomon coding permit, for a given minimum distance, a degree of the correctability to be exchanged with a degree of the detectability (and vice versa). The minimum distance can also be thought of as the power, level or degree of protection afforded by the ECC employed.

Typically, the greater the minimum distance is required to be, the higher the degree of redundancy will be. In other words, for a given number of symbols (for example, bits, bytes, characters or words), which need to be protected using ECC, an increased minimum distance implies more ECC and an attendant, higher redundancy. Accordingly, system designers are always mindful of the trade-off between how much redundancy can be tolerated (that is, how efficient a storage system is in terms of storage capacity and/or throughput or how efficient a transmission system is in terms of source data bandwidth) and how well protected the data is required to be (that is, how reliable the system is at recovering from storage or transmission errors).

SUMMARY

According to a first aspect, the present invention provides a data writer, comprising: a memory to store at least one amount of source data that is to be written to a data storage medium; a processor to arrange the source data into subsets and generate ECC data in respect of each subset, wherein the source data and the associated ECC data are to be written to a data storage medium via a plurality of individual data channels, and wherein the ECC data comprises at least a first degree of ECC protection having a first level of redundancy in respect of a first subset and a second degree of ECC protection having a second level of redundancy in respect of a second subset; a plurality of data writing elements, each to write data from an associated data channel, concurrently with the writing by the other data writing elements of data from respective data channels, to a data storage medium; and a controller, to control the writing by the data writing elements of the source data and the associated ECC data to the data storage medium.

Other aspects and embodiments of the present invention will become apparent from the following description and claims.

BRIEF DESCRIPTION OF THE DRAWINGS

Various features and advantages of the invention will become apparent from the following description of embodiments of the invention, given by way of example only, which is made with reference to the accompanying drawings, of which.

DETAILED DESCRIPTION

Various embodiments of the present invention will now be described in more detail with reference to the accompanying drawings. It will be appreciated that the invention is not limited in its application to the details of method and the arrangement of components as set forth in the following description or illustrated in the drawings. It will be apparent to a person skilled in the art that additional embodiments of the present invention not detailed in the description are possible and will fall within the scope of the present claims. Accordingly, the following description should not be interpreted as limiting in any way, and the scope of protection is defined solely by the claims appended hereto.

Some embodiments of the present invention relate to data storage, whereby source data to be stored has ECC protection applied to it before the data and ECC are stored to a storage medium such a tape storage medium. According to an embodiment, which will now be described, the tape storage medium is a magnetic tape storage medium, to which data is written by a magnetic tape storage apparatus. However, it will be appreciated that other kinds of tape media can be employed, for example optical tape media to which data is written by an optical tape media apparatus. Indeed, other kinds of storage media can equally be employed, such as (without limitation) magnetic hard disk, magnetic floppy disc or any kind of optical disk (for example, CD, DVD, Bluray, etc.).

Figure 1:
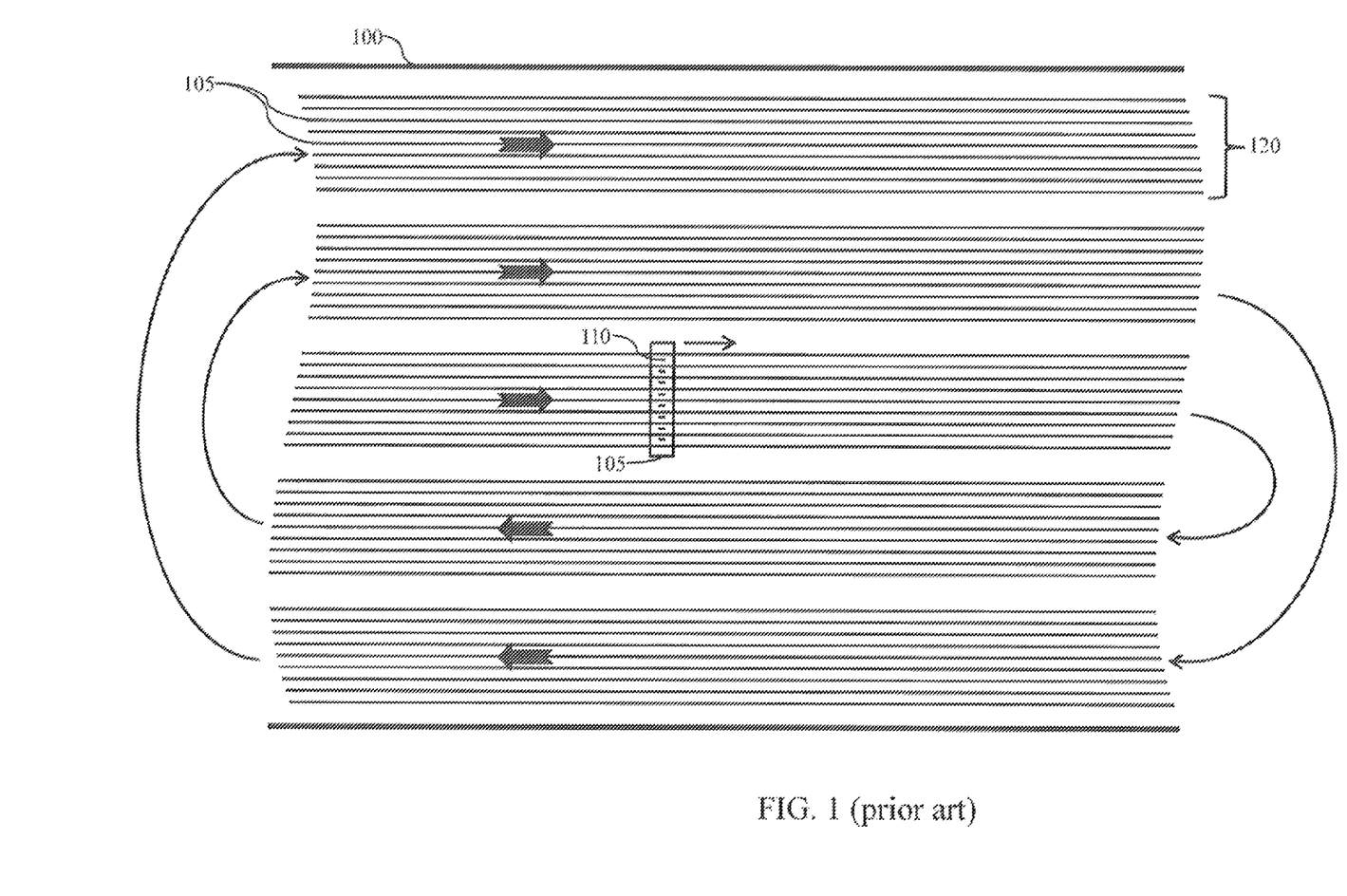
FIG. 1 is a schematic diagram representing a short length of magnetic tape medium on which tracks of data have been written.

The diagram in FIG. 1 illustrates by way of example only a short section of an elongate magnetic tape storage medium 100, on which are represented a plurality of elongate tracks of data 105. As depicted, each data track is represented as the space between two parallel black lines. The tracks of data 105 are written along the length of the tape 100 by a write channel comprising a plurality of writing elements 110, which are formed in a writing head 115 (which is illustrated for exemplary purposes only) of a data writer, which, in this instance, comprises a tape storage apparatus. This kind of tape storage, in which data is written in tracks 105 along the length of an elongate tape medium 100, is known as 'linear tape' storage, an example of which is the Ultrium™ tape storage format standard. As shown, the write head 115 has an array or bank of eight writing elements 110, which are shown aligned in the middle of each track. As the tape 100 is wound (typically on reels within a tape cartridge casing, neither of which are shown) relative to the head 115 by a tape winding mechanism (also not shown), a group of eight tracks of data can be written substantially concurrently, in parallel. In this case, the channel, in fact, comprises eight channels, each of which handles the writing of a portion of the overall data that is to be stored. Of course, other numbers of tracks can be written instead of eight: for example, four tracks, sixteen tracks or 32 tracks. The number of tracks is often (but not necessarily) a power of two, to make data processing in a digital data processing environment more straightforward. For the present purposes, each group of concurrently-written tracks will be referred to as a 'track group' 120, which is written to tape in a so-called 'wrap'. Each wrap is referred to as a forward wrap or a reverse wrap, depending on the direction of tape motion relative to the head when the wrap was written. As illustrated in FIG. 1, there are five track groups 120, which are written in five wraps: the first, innermost track group is written in a first wrap, which is written from left to right and is referred to as a forward wrap; the next track group is written directly below the inner-most wrap, by a reverse wrap, which is written from right to left; the next track group is written directly above the inner-most track group, and is a forward wrap; the penultimate track group is the lowest group, and is written by a reverse wrap; and the final track group is the upper-most group, which is written by a forward wrap. Of course, there may be a different number of track groups and wraps, with five of each being illustrated by way of example only. It will be appreciated that, at the end of each wrap, the write head is moved in a direction transverse to the longitudinal axis and motion of the tape, in order to position the heads to write each next track group.

When reading the data, which is stored on the tape in FIG. 1, a read head with a bank of read elements (not shown), would be employed to read the tracks in the same direction as they were written.

An important parameter of any data storage system is the storage capacity. Tape formats typically change from one generation to the next to provide a higher capacity and higher data transfer rates. One way to achieve higher capacity is to employ narrower read and write elements and space the elements closer together, in order to increase the data density on the storage medium. In addition to problems that arise in manufacturing smaller components, problems can arise in relation to the stability of the storage media. One such problem is tape transverse dimensional stability (TDS). TDS is a measure of changes in tape media width under different environmental conditions. Three factors that affect TDS are environmental conditions the tape media is used in (for example, which depend on temperature and humidity), the tension applied to the tape media during operation, and aging of the tape media (for example, leading to stretching). As the width of the tracks become narrower, to achieve higher data capacities on tape, controlling TDS, or finding a counter measure to TDS, become critical to successfully designing a product that can operate under an anticipated range of environmental and lifespan expectations. Excessive TDS can lead to track misregistration, which is a failure to position all parallel reader elements over the written tracks. Embodiments of the present invention provide ways to counter TDS, as will be explained.

The present inventors have appreciated that, in order to meet the physical requirements of TDS, it is beneficial to make the physical tracks within a single wrap have different widths across a single head 'span', which is the distance between the outer two head elements. According to some embodiments, the elements at the outer edges of the head span are relatively narrower than the elements at or near the middle of the head span. Typically, in prior art tape formats, all elements and respective data tracks had substantially the same width.

In general terms, as track widths decrease and attendant mechanical tolerances increase, there is an increasing likelihood of read and/or write errors occurring. One way to compensate for this is to increase the degree of ECC protection applied to the source data before the data is written to tape. However, as has already been indicated, any increase in ECC data reduces storage efficiency, which is undesirable.

Therefore, according to some embodiments, the present inventors have determined that a varying degree of ECC can be applied to different tracks, in order to maintain acceptable storage efficiency and ECC protection, while still reducing the widths of at least some of the head elements. More particularly, a greater degree of ECC protection is applied to the relatively narrower tracks while a lesser degree of ECC protection is applied to the relatively wider tracks. In some embodiments, the track widths and respective ECC can be balanced so that, in the aggregate, for a given amount of data to be stored, storage efficiency is not impacted compared with pre-existing formats, as will be described hereafter.

Figure 2:
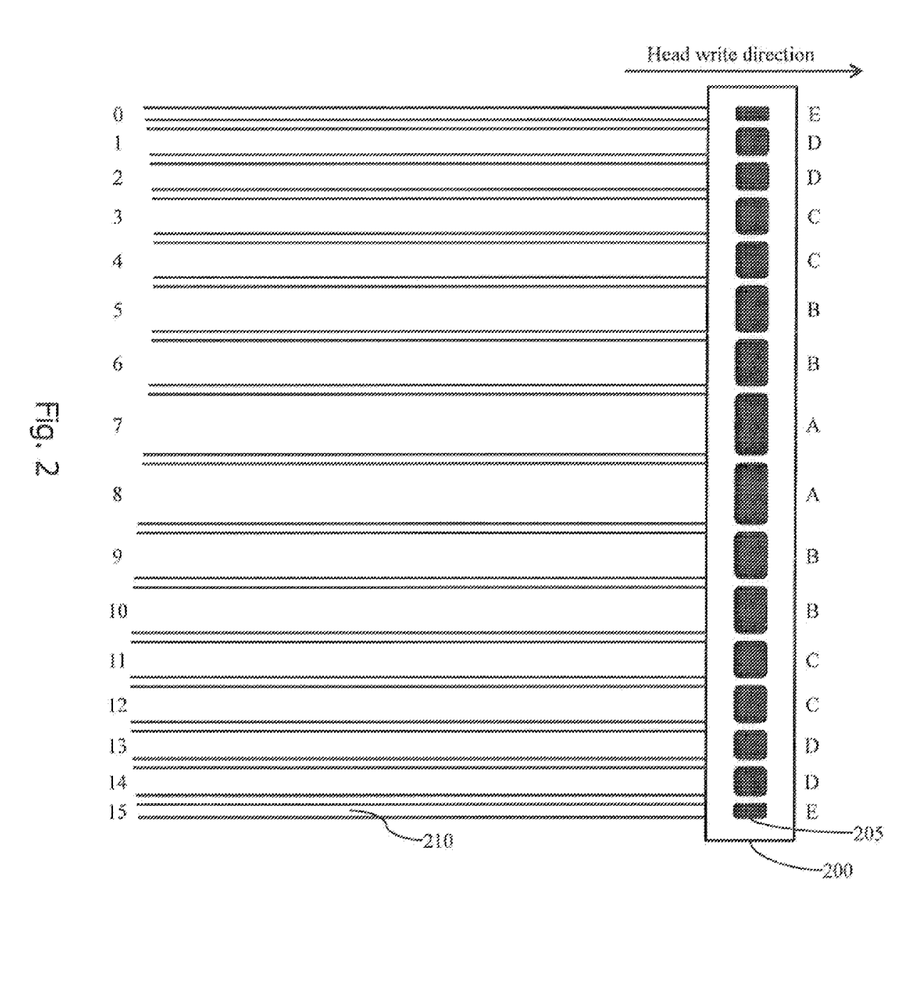
FIG. 2 is a schematic diagram illustrating an exemplary write head comprising a bank of sixteen write elements of varying width.

A head 200 and respective write elements 205 according to one exemplary embodiment of the present invention is illustrated in FIG. 2. As shown, the head 200 in this example comprises 16 write elements (associated with tracks numbered 0-15), arranged so that the innermost elements (7 and 8) are relatively wide whereas the outermost elements (0 and 15) are relatively narrow. In FIG. 2, each element is also associated with a width designation, A-E, with A being the widest element and E being the narrowest. Elements having the same width designation have substantially the same widths and produce substantially the same width of tracks, as illustrated. As can be seen, elements 8 and 9 (width A) are the widest, and elements 0 and 15 (width E) are the narrowest. Further, elements 1, 2, 13 and 14 (width B) are the next narrowest, followed by elements 3, 4, 11 and 12 (width C), and then followed by 5, 6, 9 and 10 (width D). The result of writing data using the head is illustrated in FIG. 2 by the relatively different widths of data track 210, with each track being represented as a shaded band across the page.

It will be emphasised that the absolute and relative track widths that are shown in FIG. 2 are not drawn to scale and that the diagram is merely a depiction of one exemplary embodiment of the invention.

Figure 3A:
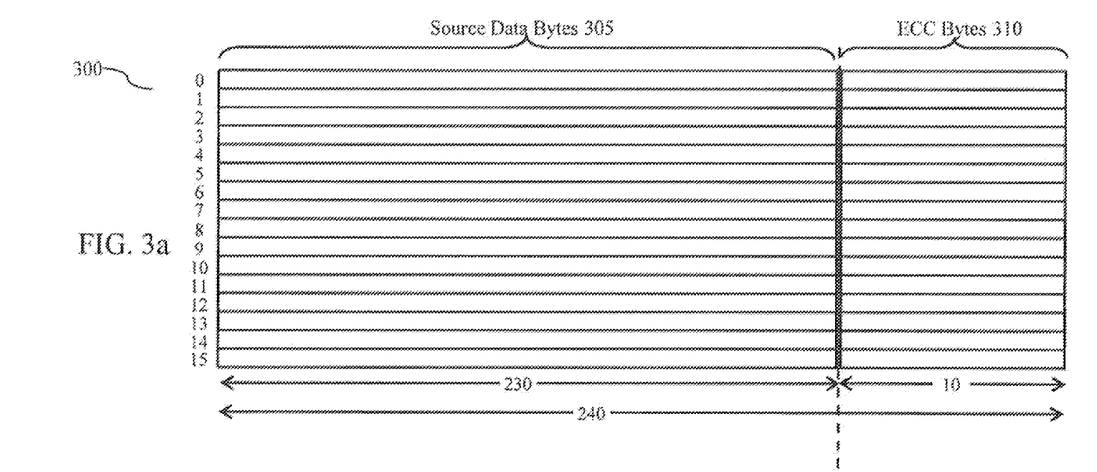
FIGS. 3a and 3b are schematic diagrams each representing a two-dimensional array of data, to which ECC has been added in different ways.

The diagram in FIG. 3a illustrates an exemplary set of data 300 comprising a two-dimensional array of protected data, comprising source data bytes 305 and ECC bytes 310. This example does not constitute an embodiment of the invention and is provided for the purposes of explanation only.

Source data can be thought of broadly as including any data that is received from a host computer system or network, which needs to be stored to tape. Source data may also include format-specific data, which has been added by upstream processing applied to the received data by a tape storage apparatus, as will be described below. The exemplary data array shown in FIG. 3a comprises protected source data 'bytes', each comprising 8 data bits. The data array is arranged into subsets, with each subset comprising one of the 16 illustrated rows, each one of which may be written by one write element of an individual channel to a track on a tape storage medium, for example of the kind illustrated in FIG. 1. In this way, each subset, or row, of the data array is written substantially concurrently, and in parallel, with the other rows, by the bank of write elements in the head. In the particular example provided, each row comprises 240 bytes, of which the first 230 bytes are data bytes and the remaining 10 bytes are ECC bytes. In total, the array comprises 3840 bytes, of which 3680 are data bytes and 160 are ECC bytes. It will be appreciated that the dimensions of the array and, more generally, the number of data and ECC bytes are given by way of example only, and it will be further appreciated that a different data array, with more or fewer data bytes and more or fewer ECC bytes may be provided, for example, depending on the degree of ECC protection that is required. It is also to be noted that the boundaries between bytes in each row are not illustrated in the diagram in FIG. 3a, for each of illustration only. It will also be appreciated that host data is unlikely to be received in convenient 3680 byte blocks: if there are fewer bytes to store then the tape storage apparatus may add dummy data to pad out the array; if there are more bytes, then, according to some embodiments of the invention, the tape storage apparatus will typically arrange the data across plural similar data arrays, each of which is processed and stored to tape in turn.

According to the example in FIG. 3a, the ECC bytes for each row of the data array are generated by a Reed-Solomon code generator, which generates a (240, 230, 11) coding. In this coding representation, the first number, '240', represents the total number of bytes, the second number, '230', represents the total number of source data bytes and the third number, '11', represents the amount of ECC protection, in this instance 11, in terms of the number of bytes that can be corrected. There are other known ways of representing ECC, which could be used instead.

The present inventors have appreciated that while the data and ECC arrangement of FIG. 3a may be optimal for a write head having write elements of equal width, since each row has associated with it the same number of ECC bytes, the arrangement is not optimal for a write head in which the write elements have unequal widths, for example as illustrated in FIG. 2. For example, if the data array of FIG. 3a were written by a write head of the kind illustrated in FIG. 2, it may be found that tracks written by a wider element would not benefit from the increased ECC protection, and the tape format efficiency would suffer from carrying excess redundancy. Likewise, without increasing the ECC protection on the narrow elements, an increase in the amount of uncorrectable data may arise.

Figure 3B:
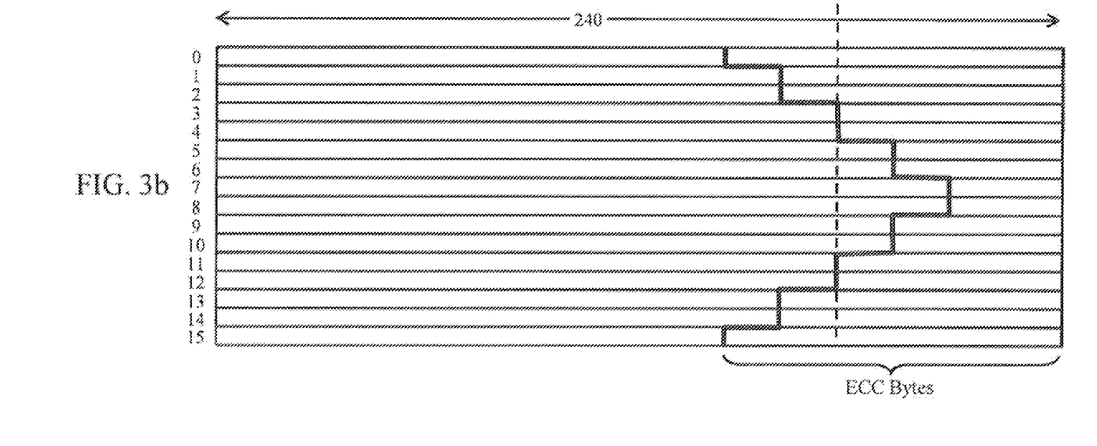

The diagram in FIG. 3b illustrates one exemplary way of arranging data in a data array according to an embodiment of the present invention, in which the degree of ECC protection applied to each subset, or row, is generally matched to the characteristics of a respective write element that is expected to write the respective data to the tape medium. In this example, the main characteristic which determines the degree of the ECC protection is the width of the respective write element.

With reference to FIG. 3b, the variation in Reed-Solomon coding is applied to each row of the data array, as follows:

Each of the outer two rows, 0 and 15, is the result of a (240, 226, 14) Reed-Solomon code applied to 226 data bytes and resulting in 14 ECC bytes.

Each of rows 1, 2, 13, 14 is the result of a (240, 228, 13) Reed-Solomon code applied to 228 data bytes and resulting in 12 ECC bytes.

Each of rows 3, 4, 11, 12, is the result of a (240, 230, 11) Reed-Solomon code applied to 230 data bytes and resulting in 10 ECC bytes.

Each of rows 5, 6, 9, 10, is the result of a (240, 232, 9) Reed-Solomon code applied to 232 bytes of data and resulting in 8 ECC bytes.

Each of rows 7 and 8 is the result of a (240, 234, 7) Reed-Solomon code applied to 234 bytes of data resulting in 6 ECC bytes.

Overall, it can be seen that the data array comprises 3840 bytes, of which 3860 bytes are data bytes and 160 bytes are ECC bytes. As shown, each row has a degree of ECC appropriate for the respective track width. For example: in one extreme, the narrowest tracks (0 and 15) each have four more ECC bytes than the equivalent tracks in FIG. 3a; and, in the other extreme, the widest tracks (7 and 8) have four fewer ECC bytes than the equivalent tracks in FIG. 3a. In between, tracks 4, 5, 11 and 12 have the same degree of ECC as the equivalent tracks in FIG. 3a. Moreover, it will be noted that the overall number of data bytes and ECC bytes in FIG. 3b matches the number of data bytes and ECC bytes in FIG. 3a. This is because, according to the example in FIG. 3b, the lower degree of ECC applied to the relatively wider tracks is equally balanced by the higher degree of ECC applied to the relatively narrower tracks. Of course, there is no reason in principle why such an equal balance is required, and any alternative arrangement of more or fewer ECC bytes per track, and/or a different size of data array, could be employed as the needs dictate.

Figure 4A:
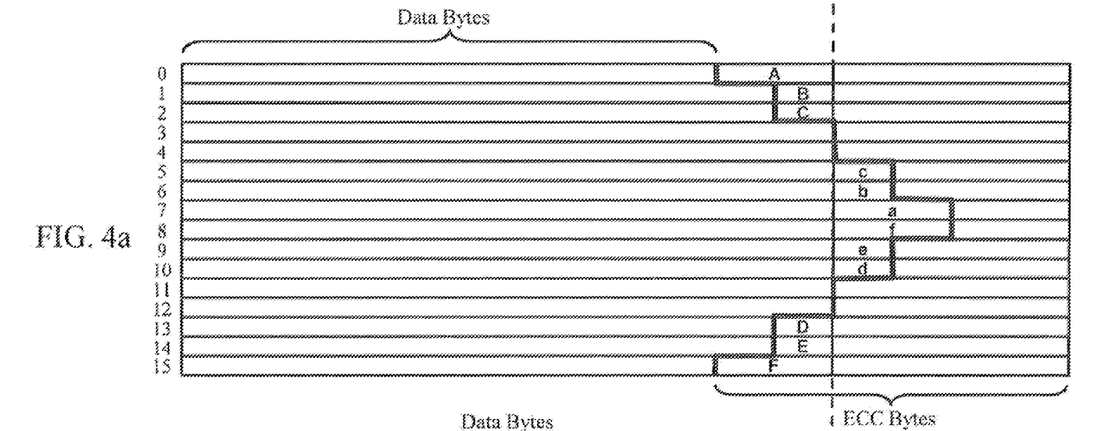
FIGS. 4a and 4b are schematic diagrams each representing a two-dimensional array of data, to which ECC has been added in different ways.
Figure 4B:
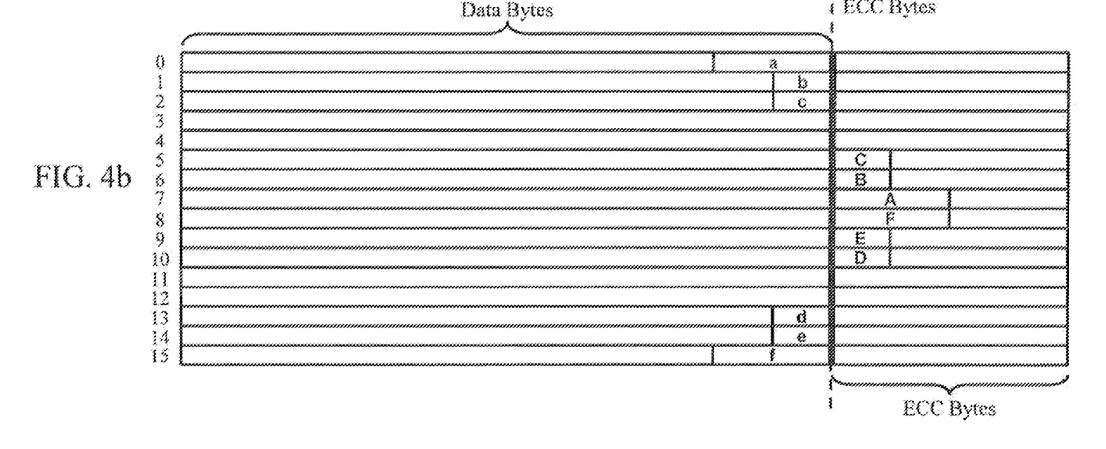

FIG. 4a reproduces FIG. 3b and, in addition, designates selected groups of source data bytes as 'a'-'f' and selected groups of ECC bytes as 'A'-'F'. FIG. 4b, illustrates an embodiment in which the identified data bytes and ECC bytes have been re-distributed as follows:

- Four ECC bytes in Group A, row 0 are exchanged with four source data bytes in Group a, row 7
- Two ECC bytes in Group B, row 1 are exchanged with two source data bytes in Group b, row 6
- Two ECC bytes in Group C, row 2 are exchanged with two source data bytes in Group c, row 5
- Two ECC bytes in Group D, row 13 are exchanged with two source data bytes in Group d, row 10
- Two ECC bytes in Group E, row 14 are exchanged with two source data bytes in Group e, row 9
- Four ECC bytes in Group F, row 15 are exchanged with two source data bytes in Group f, row 8

As will be evident, after the aforementioned redistribution of source data bytes and ECC bytes, the overall data array resembles the data array that is illustrated in FIG. 3a, insofar as there is an equal number of data bytes and ECC bytes in each row. A benefit of performing such a redistribution is that the downstream processing, as will be described hereinafter, can be simplified. It will be appreciated that, in reading the data from the tape storage medium to which the data had been written, a respective data reader would be required to reassemble the data and ECC bytes into their original positions (as shown in FIG. 4a), before performing any necessary error detection and correction, to ensure that there is a relatively greater degree of ECC applied to data that was stored in, and retrieved from, the relatively narrower tracks.

In general, although, in the foregoing examples, the source data bytes are illustrated as being arranged in the left hand side of each row and the ECC bytes are illustrated as being arranged in the right hand side of each row, it will be appreciated that such a representation has been provided for ease of explanation only. It is to be emphasised that the source data bytes and ECC bytes may be interleaved, or 'mixed' together, in any manner within each row, or, indeed, among rows. FIG. 4b, for example, illustrates one way in which certain data bytes and ECC bytes are mixed within and between rows. Many other alternative mixes are conceivable.

Figure 5:
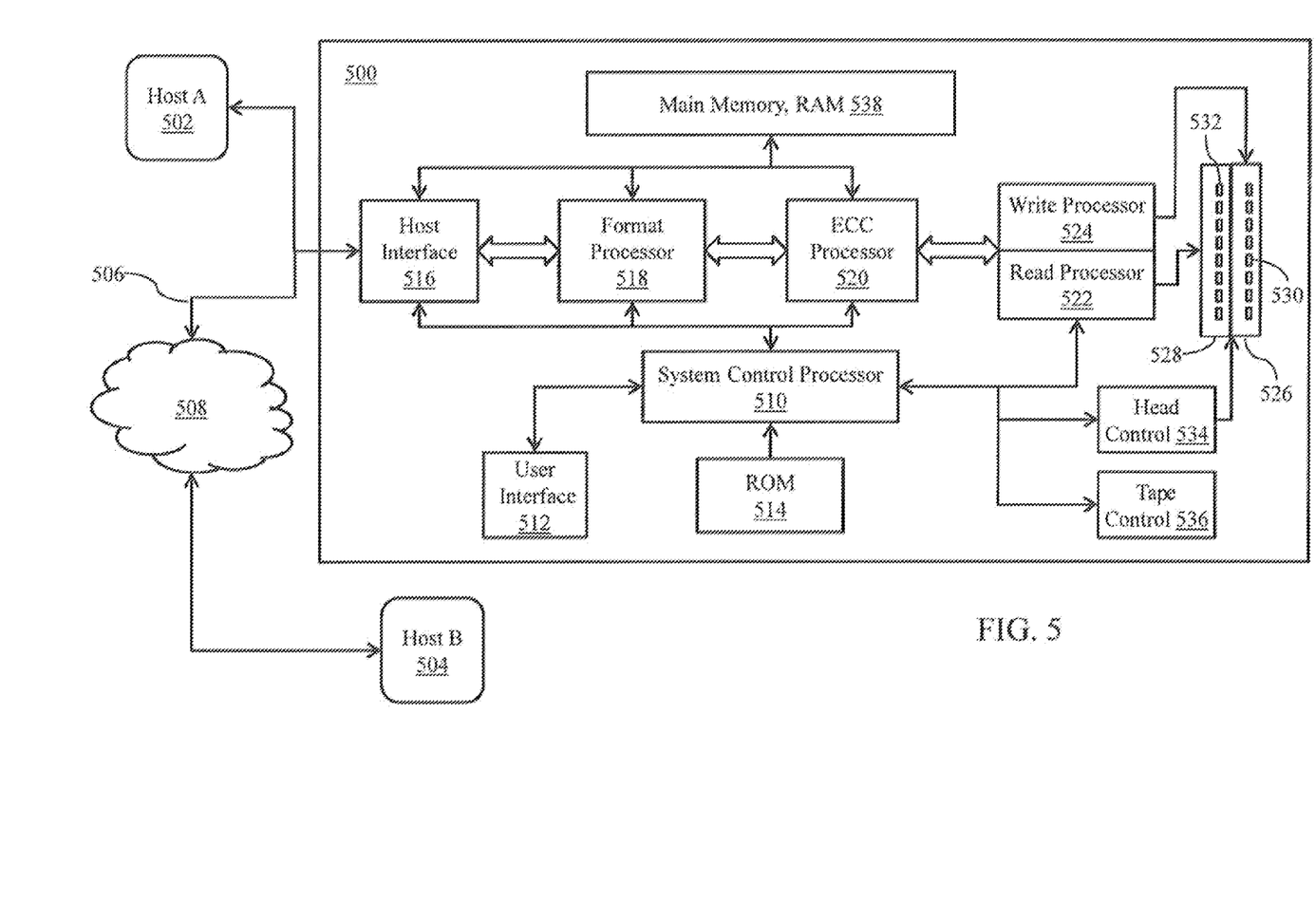
FIG. 5 is a schematic block diagram representing major functional components of a tape drive apparatus.

An exemplary data writer comprising a linear tape storage apparatus 500, according to an embodiment of the present invention, is illustrated functionally in the diagram in FIG. 5. The apparatus 500 may be attached directly to a host 502, such as Host A, or indirectly to a host 504, such as Host B, via a local 506 or wide area network 508 such as the Internet. The data writer also acts as a data reader, though, data writing will be discussed in detail in the first instance.

As shown, the storage apparatus 500 comprises a system control processor 510, which controls the overall operation of the apparatus, either in response to signals received from a user, via a user interface 512, or in response to a software application (not shown), which may be controlling the apparatus 500 from a host computer 502, 504. The system control processor 510 operates according to program instructions, which are stored in ROM 514 and read therefrom and processed by the control processor 510. The apparatus 500 comprises a data processing pipeline including a host interface 516, a format processor 518, an ECC processor 520 and read 522 and write 524 processors. In a data writing operation, each of these constituent parts process data received from a host to be stored to tape, as will be described. At the end of the pipeline is a write head 526 and a read head 528, which, as shown, each comprise respective (in this example, eight) writing elements 530 and reading elements 532. The motion of the write head 526 is controlled by a head control circuit 534, which in turn is controlled by the system control processor 510. Also shown is a tape control circuit 536, which is also controlled by the system control processor 510. The head control circuit 534 and the tape control circuit 536 respectively encompass the mechanical and electrical components that are needed to control the transverse motion of the heads and the forwards and reverse motion of a tape to which data is to be recorded. Finally, the apparatus comprises main memory 538 in the form of RAM for storing data at various stages of processing by the data processing pipeline.

It will be appreciated that the architecture of a tape storage apparatus according to an embodiment of the present invention may depart from that illustrated in FIG. 5. For example, there may be fewer or more components employed in any one or more different configurations for performing one or more functions. In some embodiments, the control processor 510 may be an embedded microprocessor or microcontroller and the elements of the pipeline may be embodied in one or more application specific integrated circuits (ASICs). In some embodiments, the Format Processor 518 and the ECC processor 520 may be embodied in a single ASIC, since all data processing is conducted in the digital domain. The write processor 524 meanwhile may be implemented as an ASICs embodying both digital and analogue processing cores, so that digital data can be received and converted into analogue data signals suitable for writing data via write elements to magnetic tape storage. The read processor 522 may also combine digital and analogue capabilities. In any event, the particular architecture shown is merely illustrative and many other alternative architectures are conceivable.

The host interface 516 controls the interactions between the tape storage apparatus 500 and a host, for both data writing and reading operations. In a write operation, the host interface 516 typically receives instructions from the host, the instructions being forwarded to the system control processor 510, to control the operation of the apparatus, for example to prepare it for receiving data to be stored. The host interface 516 is also the front end of the pipeline, and manages the transfer of data from the host into the pipeline. The host interface typically employs basic, known error detection and detection techniques to ensure that the data which is received is error free. The host interface 516 may employ any one of various known protocols, such as (but not limited to) SCSI, iSCSI, Serial Attached SCSI (SAS), SATA, Fibre Channel, USB, FireWire™.

The format processor 518 is employed to format the received data, typically according to a proprietary standard, such as the Ultrium tape format standard. For example, the format processor 518 may selectively apply data compression to the received data, using a known data compression format such as LZW or ALDC. In addition, or alternatively, the format processor 518 may apply encryption to the received data, in order to increase the security of the data once it has been stored to tape. Further, the format processor 518 may arrange the data into fixed length blocks or records, for example comprising codewords, the structure of which is typically storage-format-specific and independent of the nature of the host data. The particular details of any data storage format are beyond the scope of the present invention, and it is emphasised that a detailed understanding of the nature of any format processor 518, if one is present (and it may not be), is not significant to embodiments of the present invention. If required, further details of the Ultrium 1 data storage format standard are published as ECMA-319 standard "Data Interchange on 12.7 mm, 384-Track Magnetic Tape Cartridges—Ultrium-1 Format". Finally, the format processor 518, according to the present embodiment, arranges the resulting source data into an array of data bytes, for example as illustrated in FIG. 6, which is stored in the RAM 538, ready for the application of ECC by the ECC processor 520, as will now be described.

Figure 6:
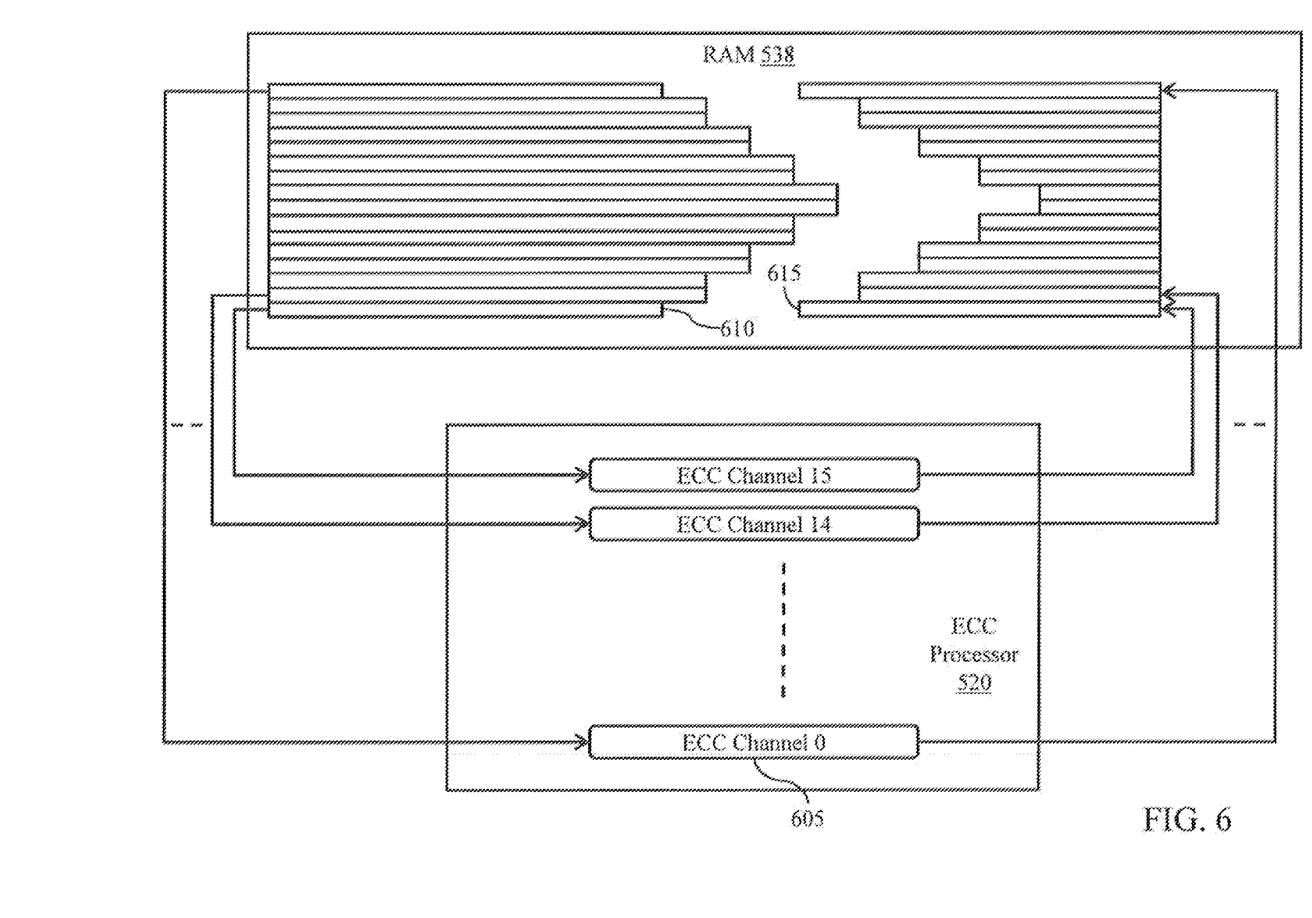
FIG. 6 is a schematic diagram illustrating functionally how an ECC processor generates ECC for plural channels of source data.

An exemplary ECC processor 520 according to the present embodiment is illustrated in FIG. 6. The illustrated ECC processor 520 comprises sixteen individual ECC channel generators 605, one for each channel, that is each row of source data 610, which is to be written to tape by a respective write element 530. Each ECC channel generator 605 is defined by a generator polynomial function, which operates in a known way on a row of source data 610 that is passed sequentially into the generator, in order to produce the respective ECC bytes 615 that are required to protect the row of data. Obviously, the number of ECC channel generators may vary. For example, instead of providing one ECC channel generator per channel there may be one per amount of source data so that the same ECC channel generator may be employed consecutively for all rows having the same number of source data bytes. With respect to the data array of FIG. 3b, for example, the same ECC channel generator may be used for rows 1, 2, 13 and 14, as each of those rows has the same number of source data bytes. Likewise, the same ECC channel generator may be used for rows 0 and 15, and a different ECC channel generator may be used for rows 3, 4, 11 and 12; and so on. Of course, using the same ECC channel generator for plural rows is likely to slow the storage pipeline down, compared with having an independent ECC channel generator for each channel.

According to prior art systems in which each row has associated with it an equal number of ECC bytes (or, more generally, ECC symbols), there only needs to be one definition of generator polynomial function to operate on each row of data. In contrast, embodiments of the present invention typically employ a different generator polynomial function to produce a respective degree of ECC protection for each respective row of source data. For example, according to an embodiment of the invention, a set of exemplary generator polynomial functions to watch the ECC coding requirements of FIG. 3b are:

(240, 234, 7): 6 byte ECC $$G(x)=(x+\alpha^{125})(x+\alpha^{126})(x+\alpha^{127})(x+\alpha^{128})(x+\alpha^{129})(x+\alpha^{130})$$

(240, 232, 9): 8 bye ECC $$G(x)=(x+\alpha^{124})(x+\alpha^{125})(x+\alpha^{126})(x+\alpha^{127})(x+\alpha^{128})(x+\alpha^{129})(x+\alpha^{130})(x+\alpha^{131})$$

(240, 230, 11): 10 byte ECC $$G(x)=(x+\alpha^{123})(x+\alpha^{124})(x+\alpha^{125})(x+\alpha^{126})(x+\alpha^{127})(x+\alpha^{128})(x+\alpha^{129})(x+\alpha^{130})(x+\alpha^{131})(x+\alpha^{132})$$

(240, 228, 13): 12 byte ECC $$G(x)=(x+\alpha^{122})(x+\alpha^{123})(x+\alpha^{124})(x+\alpha^{125})(x+\alpha^{126})(x+\alpha^{127})(x+\alpha^{128})(x+\alpha^{129})(x+\alpha^{130})(x+\alpha^{131})(x+\alpha^{132})(x+\alpha^{133})$$

(240, 226, 14): 14 byte ECC $$G(x)=(x+\alpha^{121})(x+\alpha^{122})(x+\alpha^{123})(x+\alpha^{124})(x+\alpha^{125})(x+\alpha^{126})(x+\alpha^{127})(x+\alpha^{128})(x+\alpha^{129})(x+\alpha^{130})(x+\alpha^{131})(x+\alpha^{132})(x+\alpha^{133})(x+\alpha^{134})$$

where the $\alpha^n$ values are the roots of the equations.

It will be appreciated that the particular generators used would be designed in a known way to suit the particular ECC requirements of the associated channels. In any event, ECC generator polynomial functions may be realised by generator circuits, of which one is exemplified in FIG. 7, by expanding the foregoing equations. For example, the expanded form of the (240, 234, 7): 6 byte ECC equation, which is depicted in FIG. 7, is:

$$G(x)=x^6\oplus\alpha^{36}x^5\oplus\alpha^{250}x^4\oplus\alpha^{254}x^3\oplus\alpha^{250}x^2\oplus\alpha^{36}x\oplus1$$

Similar circuits, though with more stages, would be employed to compute the other generator polynomial functions.

Figure 7:
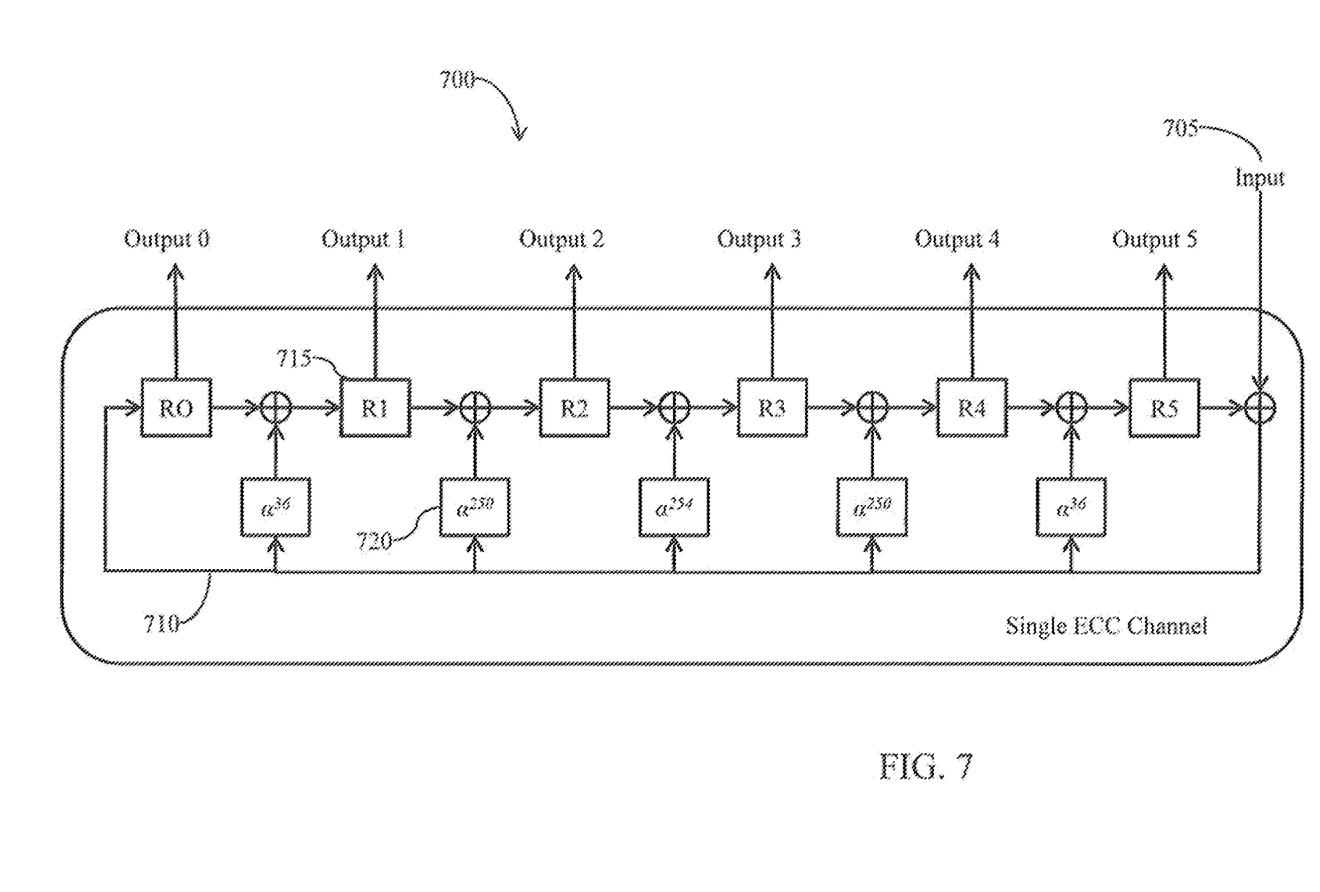
FIG. 7 is a schematic diagram representing an ECC generator associated with one channel of an ECC processor.

As shown in FIG. 7, a row of source data would be transmitted sequentially into an input 705 of the circuit 700 and would propagate through the circuit. In the example shown, the circuit is formed as a feedback loop 710, in which there are six register blocks (R0-R5) 715 in series, and an input of each register block is a function of the input values and an output (where present) of a previous register block. The inputs to register blocks R1-R5 715 are influenced, in particular, by multiplier blocks 720 each containing an associated expanded coefficient, $\alpha^m$. Of course, the number of register blocks 715 and multiplier blocks 720 is adjusted for the degree of ECC protection required. The individually generated ECC bytes are the values that remain in the register blocks R1-R5, after the entire row of source data has been input, and are output (as Output0-Output5) at the end of the process from each respective register block. The manner of generating Reed-Solomon codes using generator polynomial functions as illustrated above and circuits as illustrated in FIG. 7 is well known in the art of data storage and data transmission, and further detailed explanation will not be provided herein.

In addition, in embodiments in which the protected data is re-arranged, for example, as illustrated in FIG. 4b wherein each row has an equal amount of source data and ECC data, a final step is to re-arrange the data so that each row comprises and equal amount of source data bytes and ECC data bytes.

It will be appreciated that, although not described herein, in some embodiments of the invention, additional layers or levels of ECC may be employed to protect a set or array of data. For example, in addition to protecting each row of the array of source data, it may be desirable to protect each column of the array of data with additional ECC protection. In such embodiments, for example, the ECC bytes protecting the columns (including columns comprising or including one or more row ECC bytes) may be distributed among the rows before the data is written to tape. Embodiments of the present invention encompass all manner of additional ECC encoding applied to source data.

Once the ECC bytes have been generated, and if necessary re-arranged, the protected data (including the source data bytes and the ECC code bytes) may be written to tape. The protected data may be written directly to tape by the write processor 525 or it may be further encoded by the write processor, for example by employing known run-length limited (RLL) encoding or similar. Although not shown, for ease of illustration only, the write processor typically comprises one processing path for each channel, to deliver data to each individual write element in the write head. The application and form of any additional coding of the protected data is beyond the scope of the present invention. In any event, the write processor 524 converts the protected data into a form suitable for energising the write elements to write data to a magnetic tape medium in a known way.

A data reading operation, in which the tape apparatus 500 is controlled to read data from a tape medium 100, reverses the flow of data from the read elements 532, to the read processor 522 (which removes any RLL encoding or the like), through the ECC processor 520 (this time arranged in a known way to detect and/or correct erroneous data using known ECC recovery techniques), through the format processor 518 (to remove any format specific structure and encoding), and back to a host 502, 504 via the host processor 516. Data read operations of this kind are generally well known. However, according to embodiments of the present invention, the ECC processor 520 again has to perform error detection and/or correction on rows of data having different amounts of source data. In addition, in embodiments in which the protected data is arranged, for example, as illustrated in FIG. 4*b*, so that each row had an equal amount of source data and ECC data before being stored, a preliminary step is to re-arrange the data so that the correct ECC data bytes are associated with the respective source data rows.

A data storage operation for storing data according to an embodiment of the present invention will now be described with reference to the flow diagram in FIG. 8*a*.

Figure 8A:
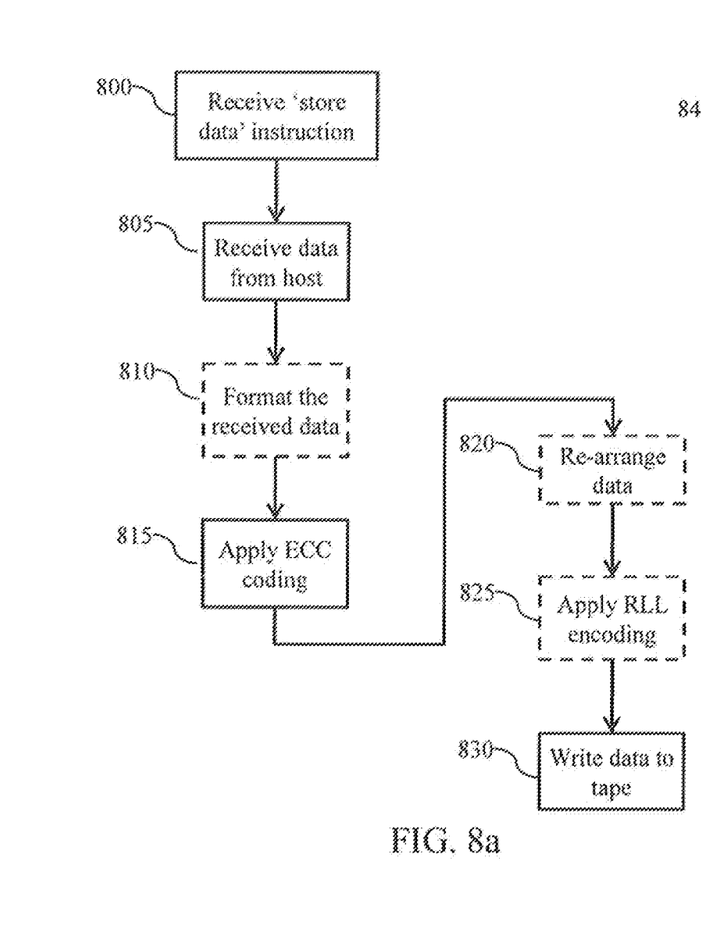
FIG. 8a is a flow diagram representing the steps involved in a data writing operation.

According to FIG. 8*a*, in a first step [step 800], a host (for example, 502) instructs a tape storage apparatus 500 according to an embodiment of the present invention to store an amount of data to tape 100. The data is then transferred [step 805] by the host 502, via the host interface 516, into the main memory 538 of the tape storage apparatus 500. Next [step 810], the format processor 518 optionally applies a format-specific structure to the received data and arranges the data into an array of source data. An optional step is illustrated in a flow chart block bounded by a broken line rather than by a solid line. It will be appreciated that the particular manner in which the data is stored in main memory 538, at any stage of processing by the tape drive apparatus, is not significant to embodiments of the invention. Next [step 815], the ECC processor 520 generates ECC data for each row of the array of source data and stores the ECC data, in association with the respective row of source data, in main memory 538. Optionally [step 820], the ECC processor 520 re-arranges the source data and ECC data so that each row in the array of protected data includes the same number of data bytes and ECC bytes. Next [step 825], the write processor 524 optionally applies RLL encoding to the data and transmits the data to a respective write element in the write head, for the data to be written to the tape medium [step 830]. As has already been explained, in the event the amount of source data to be stored exceeds the size of one array, plural arrays are generated and stored in series.

A storage read operation for reading stored data according to an embodiment of the present invention will now be described with reference to the flow diagram in FIG. 8*b*.

Figure 8B:
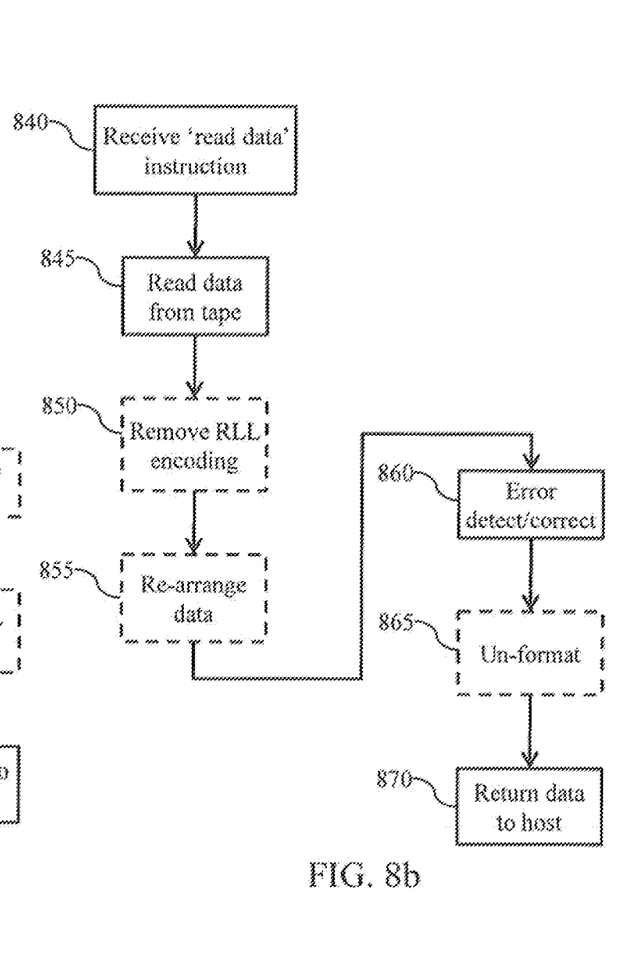
FIG. 8b is a flow diagram representing the steps involved in a data reading operation.

According to FIG. 8*b*, in a first step [840], a host (for example, host 502) instructs a tape storage apparatus 500 according to an embodiment of the present invention to read an amount of data from tape 100. The data is read from the tape [step 845] and, optionally [step 850], the read processor 522 removes any RLL encoding. Next [step 855], the ECC processor 510 optionally (if the data and ECC bytes had been re-arranged (for example, balanced) before being stored) re-arranges the recovered data bytes and ECC bytes so that each row of an associated data array is matched with the appropriate ECC bytes. The ECC processor 520 then [step 860] detects and/or corrects any errors that have arisen in the recovered data. Next [step 865], the format processor 518 optionally removes any format-specific structure that has been applied to the data and the host interface 816 returns the data to the requesting host [870].

It will be appreciated that the examples provided herein of how to arrange data and ECC coding over plural parallel channels represent only a small sample of alternative arrangements. For example, there is in principle no reason why different degrees of ECC coding cannot be applied to different channels based on channel characteristics other than channel write head width. For example, another channel characteristic may depend on the performance of a write element: if a write element is found to perform slightly less well than other write heads, the tape apparatus may be adaptable to apply additional ECC to the channel that is written by the respective write element. In another example, if the tape (or other storage medium) to which the data is written is found to be less reliable in the longitudinal direction along the direction of one particular write element, for example due to wear or a scratch, then additional ECC protection may be applied to the channel that is to be written over that area of tape. Of course, if the tape is no longer of an acceptable standard, it would not be used at all.

While embodiments of the present invention have been mainly described by reference to data storage, there is no reason why the same principle, of applying different degrees of ECC protection to different channels, cannot be employed in communications systems in which data is communicated, substantially in parallel over plural separate channel, for example in dependence upon the nature or characteristics of the respective channels. Embodiments of the present invention, therefore, encompass data transmission and reception as well as data storage and recovery.

The above embodiments are to be understood as illustrative examples of the invention. Further embodiments of the invention are envisaged. For example, similar principles may be applied to other kinds of magnetic storage media, such as floppy disk or hard disk, and to other kinds of data writer or data reader, for example using optical rather than magnetic storage techniques. It is to be understood that any feature described in relation to any one embodiment may be used alone, or, if the context permits, in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A data writer, comprising:
    a memory to store at least one amount of source data that is to be written to a data storage medium;
    a processor to arrange the source data into subsets and generate ECC data in respect of each subset, wherein the source data and the associated ECC data are to be written to a data storage medium via a plurality of individual data channels, and wherein the ECC data comprises at east a first degree of ECC protection having a first level of redundancy in respect of a first subset and a second degree of ECC protection having a second level of redundancy in respect of a second subset;
    a plurality of data writing elements, each to write data from an associated data channel, concurrently with the writing by the other data writing elements of data from respective data channels, to a data storage medium; and
    a controller, to control the writing by the data writing elements of the source data and the associated ECC data to the data storage medium.

2. A data writer according to claim 1, arranged to write each subset and the respective ECC data via a respective data channel by an associated data writing element.

3. A data writer according to claim 1, arranged to assemble subset data and ECC data so that the data to be written via each data channel comprises an equal amount of source data and an equal amount of ECC data.

4. A data writer according to claim 1, which has at least a first writing element to write a track of data having a first track width and a second writing element to write a track of data having a second track width.

5. A data writer according to claim 4, in which each writing element is associated with a degree of ECC protection commensurate with the associated track width.

6. A data writer according to claim 4, wherein a greater degree of ECC is associated with a narrower track width and a lesser degree of ECC is associated with a wider track width.

7. A data writer according to claim 1, wherein the source data and ECC data are assembled so that each channel writes an equal amount of source data and each channel writes an equal amount of ECC data.

8. A data writer according to claim 1, wherein 8, 16 or 32 data writing dements operable to write, consecutively, 8, 16 or 32 respective tracks of data.

9. A data writer according to claim 1, arranged to write data in elongate tracks parallel to a longitudinal axis of an elongate tape data storage medium, the plurality of data writing elements being arranged in a generally linear array, having an axis, extending through each of the writing elements, which is transverse to the longitudinal axis of the tape storage medium, whereby the writing elements can each be controlled to write a track of data, in parallel with the other writing elements, to the tape storage medium, the writing elements comprising at least a first writing element to write a track of data having a first track width and a second writing element to write a track of data having a second track width.

10. A data writer according to claim 8, wherein writing elements generally at the outer edges of the array write relatively narrower tracks and writing elements generally in the middle of the array write relatively wider tracks.

11. A data writer according to claim 9, wherein a greater degree of ECC is associated with a narrower track width and a lesser degree of ECC is associated with a wider track width.

12. A data writer according to claim 1, wherein the ECC comprises Reed-Solomon codes.

13. A data writer according to claim 1, comprising sixteen subsets, of which: ECC applied to subsets 0 and 15, is the result of a (240, 226, 15) Reed-Solomon code applied to 226 data bytes and resulting in 14 ECC bytes; ECC applied to subsets 1, 2, 13, 14 is the result of a (240, 228, 13) Reed-Solomon code applied to 228 data bytes and resulting in 12 ECC bytes; ECC applied to subsets 3, 4, 11, 12, is the result of a (240, 230, 11) Reed-Solomon code applied to 230 data bytes and resulting in 10 ECC bytes; ECC applied to subsets 5, 6, 9, 10, is the result of a (240, 232, 9) Reed-Solomon code applied to 232 bytes of data and resulting in 8 ECC bytes; and ECC applied to subsets 7 and 8 is the result of a (240, 234, 7) Reed-Solomon code applied to 234 bytes of data resulting in 6 ECC bytes.

14. A data writer according to claim 1, which is arranged to write data to a magnetic tape data storage medium.

15. A data writer according to claim 1, which is arranged to write data to an optical tape data storage medium.

16. A data reader, comprising: a plurality of data reading elements, each to read data from an associated track of data on a data storage medium, concurrently with reading by the other data reading elements of data from respective tracks of data; a memory to store data that is read from the data storage medium; a processor to arrange the read data into subsets, each comprising source data and ECC data, and process the source data using the ECC data in order to detect and/or correct any associated read errors, wherein the ECC data comprises at least a first degree of ECC protection having a first level of redundancy in respect of a first subset and a second degree of ECC protection having a second level of redundancy in respect of a second subset; and a controller, to control the operation of the data reader.

17. A method of writing data to a data storage medium, the method including: receiving source data to be written to a data storage medium; arranging the source data into subsets and generating ECC data in respect of each subset, wherein the ECC data comprises at least a first degree of ECC protection having a first level of redundancy in respect of a first subset and a second degree of ECC protection having a second level of redundancy in respect of a second subset; and writing the source data and the associated ECC data to a data storage medium via a plurality of individual data channels.

18. A data processor to arrange source data into subsets and generate ECC data in respect of each subset, wherein the ECC data comprises at least a first degree of ECC protection having a first level of redundancy in respect of a first subset and a second degree of ECC protection having a second level of redundancy in respect of a second subset.

19. A data storage medium comprising, written thereon, a plurality of tracks of data, each track of data comprising a subset of data from a data set and ECC data associated with the data set, wherein the ECC data comprises at least a first degree of ECC protection having a first level of redundancy in respect of a first subset and a second degree of ECC protection having a second level of redundancy in respect of a second subset.

* * * * *

UNITED STATES PATENT AND TRADEMARK OFFICE
CERTIFICATE OF CORRECTION

PATENT NO.      : 9,158,634 B2                                      Page 1 of 1
APPLICATION NO. : 14/113957
DATED           : October 13, 2015
INVENTOR(S)     : John D. Hampton et al.

It is certified that error appears in the above-identified patent and that said Letters Patent is hereby corrected as shown below:

In the claims

In column 12, lines 49-50, in Claim 1, delete "at east" and insert -- at least --, therefor.

In column 13, line 16, in Claim 8, delete "dements" and insert -- elements --, therefor.

Signed and Sealed this
Fifteenth Day of March, 2016

Michelle K. Lee
*Director of the United States Patent and Trademark Office*